(12) United States Patent
Rodriguez, II et al.

(10) Patent No.: US 12,007,568 B2
(45) Date of Patent: *Jun. 11, 2024

(54) EYEWEAR WITH INTEGRATED HEADS-UP DISPLAY

(71) Applicant: Snap Inc., Santa Monica, CA (US)

(72) Inventors: Jonathan M Rodriguez, II, Los Angeles, CA (US); Kimberly A. Phifer, Brooklyn, NY (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,373

(22) Filed: Sep. 2, 2022

(65) Prior Publication Data
US 2023/0042383 A1    Feb. 9, 2023

Related U.S. Application Data

(63) Continuation of application No. 16/948,081, filed on Sep. 2, 2020, now Pat. No. 11,435,587, which is a continuation of application No. 16/123,853, filed on Sep. 6, 2018, now Pat. No. 10,816,805, which is a continuation of application No. 14/806,840, filed on Jul. 23, 2015, now Pat. No. 10,095,034.

(51) Int. Cl.
*G02B 27/01*    (2006.01)

(52) U.S. Cl.
CPC .. *G02B 27/0172* (2013.01); *G02B 2027/0178* (2013.01)

(58) Field of Classification Search
CPC .................................. G02B 27/0172
USPC ..................................... 359/630
See application file for complete search history.

(56) References Cited

U.S. PATENT DOCUMENTS

| | | |
|---|---|---|
| 3,936,605 A | 2/1976 | Upton |
| 4,751,691 A | 6/1988 | Perera |
| 4,796,987 A | 1/1989 | Linden |
| 4,867,551 A | 9/1989 | Perera |

(Continued)

FOREIGN PATENT DOCUMENTS

| | | |
|---|---|---|
| CA | 2887596 A1 | 7/2015 |
| WO | WO-2012161639 A1 | 11/2012 |

OTHER PUBLICATIONS

"U.S. Appl. No. 14/806,840, Non Final Office Action dated Sep. 28, 2016", 11 pgs.

(Continued)

*Primary Examiner* — James R Greece
(74) *Attorney, Agent, or Firm* — SCHWEGMAN LUNDBERG & WOESSNER, P.A.

(57) ABSTRACT

Systems and methods for eyewear devices with integrated heads-up displays are provided. In one embodiment, an eyewear device provides an integrated heads-up display having a partially reflective element carried by an eyeglass lens to reflect towards the user computer-generated imagery projected on to it, while permitting the passage of light through the reflective surface in the direction of view of the user. The display mechanism further includes a cooperating projector assembly housed by a frame of the eyewear device in an overhead configuration relative to the partially reflective element. The projector assembly is housed by a top bar of the eyewear frame, with the reflective surface being housed wholly within the lens.

17 Claims, 5 Drawing Sheets

(56) References Cited

U.S. PATENT DOCUMENTS

| | | | |
|---|---|---|---|
| 5,886,822 A * | 3/1999 | Spitzer | G02B 27/145 |
| | | | 359/633 |
| 6,038,295 A | 3/2000 | Mattes | |
| 6,091,546 A * | 7/2000 | Spitzer | G02B 27/0172 |
| | | | 351/158 |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 7,791,809 B2 | 9/2010 | Filipovich et al. | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,477,425 B2 | 7/2013 | Border et al. | |
| 8,531,355 B2 | 9/2013 | Maltz | |
| 8,718,333 B2 | 5/2014 | Wolf et al. | |
| 8,724,622 B2 | 5/2014 | Rojas | |
| 8,743,464 B1 * | 6/2014 | Amirparviz | G02B 27/0081 |
| | | | 359/633 |
| 8,761,513 B1 | 6/2014 | Rogowski et al. | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,223,134 B2 * | 12/2015 | Miller | G06Q 30/02 |
| 9,291,823 B2 * | 3/2016 | Cazalet | G02C 5/008 |
| 9,436,009 B1 * | 9/2016 | Bhardwaj | G06F 1/1656 |
| 9,443,227 B2 | 9/2016 | Evans et al. | |
| 9,489,661 B2 | 11/2016 | Evans et al. | |
| 9,491,134 B2 | 11/2016 | Rosen et al. | |
| 10,095,034 B1 | 10/2018 | Rodriguez, II et al. | |
| 10,816,805 B1 | 10/2020 | Rodriguez, II et al. | |
| 11,435,587 B2 | 9/2022 | Rodriguez, II et al. | |
| 2003/0184575 A1 | 10/2003 | Reho et al. | |
| 2005/0012683 A1 | 1/2005 | Chen | |
| 2007/0047091 A1 | 3/2007 | Spitzer et al. | |
| 2007/0153395 A1 * | 7/2007 | Repetto | G02B 17/0856 |
| | | | 359/630 |
| 2011/0202598 A1 | 8/2011 | Evans et al. | |
| 2011/0214082 A1 | 9/2011 | Osterhout et al. | |
| 2012/0209924 A1 | 8/2012 | Evans et al. | |
| 2013/0009853 A1 | 1/2013 | Hesselink et al. | |
| 2015/0036221 A1 * | 2/2015 | Stephenson | G02B 26/10 |
| | | | 359/630 |
| 2015/0126845 A1 * | 5/2015 | Jin | G06F 1/163 |
| | | | 600/383 |
| 2015/0168730 A1 * | 6/2015 | Ashkenazi | G02B 27/0176 |
| | | | 359/630 |
| 2021/0231953 A1 | 7/2021 | Rodriguez, II et al. | |

OTHER PUBLICATIONS

"U.S. Appl. No. 14/806,840, Notice of Allowance dated Jan. 24, 2018", 8 pgs.

"U.S. Appl. No. 14/806,840, Notice of Allowance dated May 4, 2017", 7 pgs.

"U.S. Appl. No. 14/806,840, Notice of Allowance dated Jun. 1, 2018", 8 pgs.

"U.S. Appl. No. 14/806,840, Notice of Allowance dated Aug. 24, 2017".

"U.S. Appl. No. 14/806,840, Response filed Feb. 28, 2017 to Non Final Office Action dated Sep. 28, 2016", 13 pgs.

"U.S. Appl. No. 16/123,853, 312 Amendment filed Aug. 26, 2020", 6 pgs.

"U.S. Appl. No. 16/123,853, Non Final Office Action dated Dec. 6, 2019", 12 pgs.

"U.S. Appl. No. 16/123,853, Notice of Allowance dated May 28, 2020", 7 pgs.

"U.S. Appl. No. 16/123,853, PTO Response to Rule 312 Communication dated Oct. 2, 2020", 2 pgs.

"U.S. Appl. No. 16/123,853, Response filed Mar. 6, 2020 to Non Final Office Action dated Dec. 6, 2019", 10 pgs.

"U.S. Appl. No. 16/948,081, 312 Amendment filed Jul. 20, 2022", 6 pgs.

"U.S. Appl. No. 16/948,081, Notice of Allowance dated Apr. 25, 2022", 9 pgs.

"U.S. Appl. No. 16/948,081, Preliminary Amendment filed May 25, 2021", 5 pgs.

"U.S. Appl. No. 16/948,081, PTO Response to Rule 312 Communication dated Jul. 28, 2022", 2 pgs.

"DLP Technology for Near Eye Display", Texas instruments white paper, (Sep. 2014), 17 pgs.

"IBM's wearable PC may debut early next year", [Online] Retrieve from the Internet: <URL:https://www.cnet.com/news/more-details-emerge-on-ibms-wearable-pc/>, (Jun. 30, 2000), 2 pgs.

"More details emerge on IBM's wearable PC", [Online]. Retrieved from the Internet: <URL:https://www.cnet.com/news/more-details-emerge-on-ibms-wearable-pc/>, (Jan. 2, 2002), 4.

Giartosio, Francesco, "Glass Up—YouTube", YouTube, [Online]. Retrieved from the Internet: <URL: https://www.youtube.com/watch?v=os6bqbTo4Qs>, (Jun. 7, 13), 4 pgs.

Giartosio, Francesco, "GlassUp: Augmented Reality glasses that display message from your smartphone", Indiegogo, Inc., [Online]. Retrieved from the Internet: <URL: https://www.indiegogo.com/projects/glassup-augmented--augmented-glasses-that-...>, (Accessed Apr. 7, 2015), 23 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

* cited by examiner

EYEWEAR WITH INTEGRATED HEADS-UP DISPLAY

CLAIM OF PRIORITY

This application is a continuation of and claims the benefit of priority of U.S. patent application Ser. No. 16/948,081, filed on Sep. 2, 2020, which is a continuation of and claims the benefit of priority of U.S. patent application Ser. No. 16/123,853, filed on Sep. 6, 2018, now issued as U.S. Pat. No. 10,816,805, which is a continuation of and claims the benefit of priority of U.S. patent application Ser. No. 14/806,840, filed on Jul. 23, 2015, now issued as U.S. Pat. No. 10,095,034, each of which are hereby incorporated by reference herein in their entireties.

BACKGROUND

Some electronics-enabled eyewear devices, such as so-called smart glasses, include a near-eye display for displaying computer-generated images to a user while wearing the eyewear. Such displays are in some instances provided by an optical head-mounted display that has the capability of reflecting artificial images while being at least partially transmissive, allowing the user to look at real images from the ambient environment.

Integrated optical head-mounted displays are often, however, relatively bulky and often include prominent externally visible components. This can adversely affect wearability, weight, and aesthetic appeal of the glasses.

BRIEF DESCRIPTION OF THE DRAWINGS

Various ones of the appended drawings illustrate merely example embodiments of the present disclosure and should not be considered as limiting its scope.

DETAILED DESCRIPTION

Figure 1:
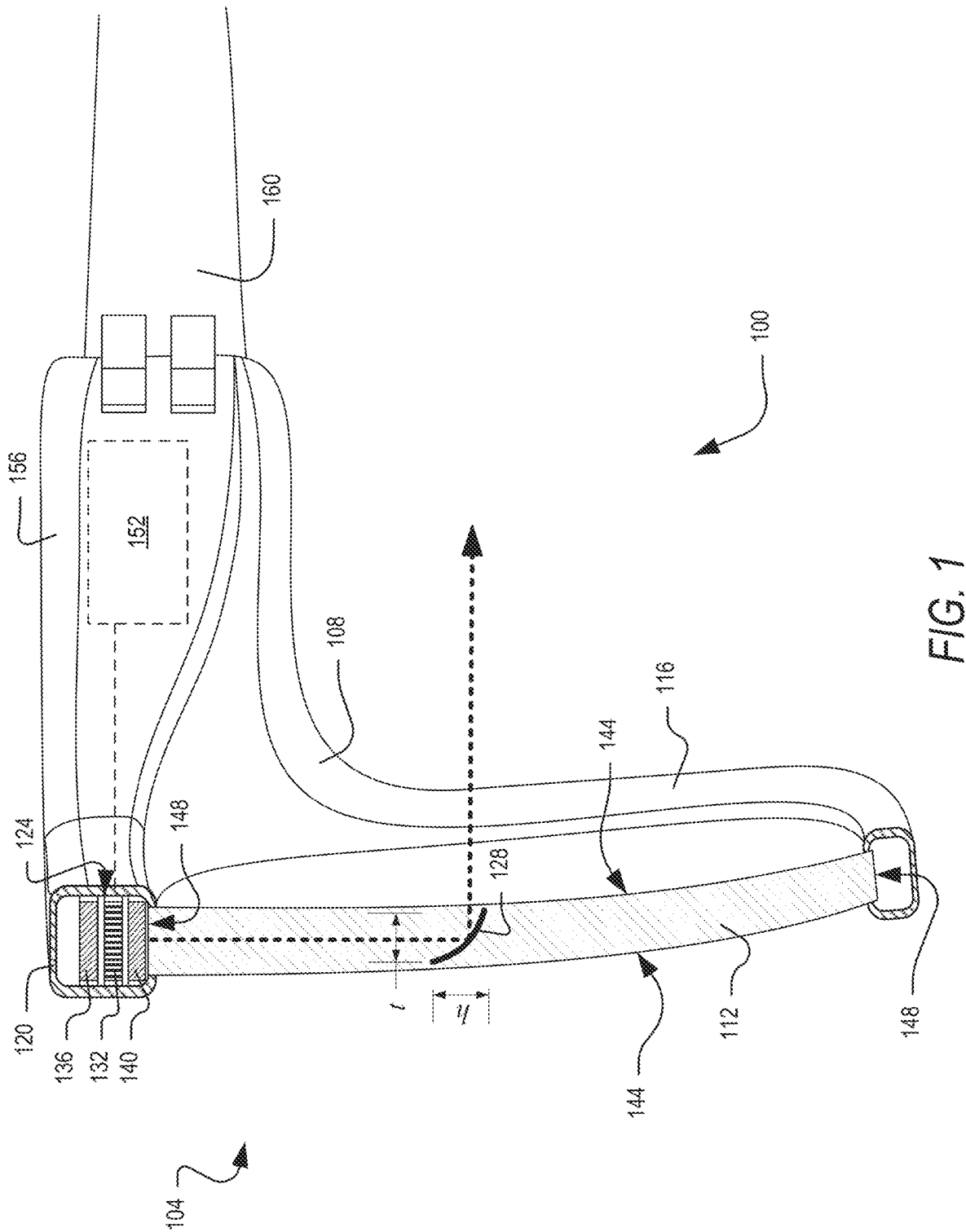
FIG. 1 is a schematic elevational cross-section of an eyewear device according to an example embodiment, the cross-section being taken transversely through one of a pair of lenses forming part of the eyewear device.

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

One of the aspects disclosed by the described embodiments includes an article of eyewear (e.g., glasses) having an integrated near-eye display mechanism configured to display visual information in a limited display area corresponding more or less to a line of text extending across a user's field of view, in use. Such limitation of the display area allows for more effective structural integration of the display mechanism in the article of eyewear.

In some example embodiments, the display mechanism comprises a partially transmissive reflector carried by a transmissive optical element, and a projector assembly for projecting visual information to be displayed to the user on to the transmissive reflector. In some embodiments, the transmissive optical element comprises an eyeglass lens held before the user's eye by an eyewear frame, the partially transmissive reflector comprising a partially reflective display mirror carried by the lens.

In some embodiments, the display mirror is located entirely within the associated lens, for example being embedded within an optical medium provided by the lens. Note that a thickness dimension of the display mirror (i.e., the physical extent of the display mirror in a direction substantially transverse to a major outer face of the lens—see for example dimension t in FIG. 1) is to some extent dictated by orthogonal width and height dimensions of the reflective surface of the display mirror (see for example dimensions h and w in FIG. 2). By limiting one of these two orthogonal dimensions to a size corresponding to somewhat more than a single text character readily readable by the user, the thickness dimension of the display mirror is constrained sufficiently to allow location of the display mirror wholly within the lens, without necessitating the use of excessively thick lenses for the eyewear. In some embodiments (for example, in the example embodiments described below with reference to FIGS. 1 and 2), the height dimension (h) of the display mirror or reflector is limited to somewhat more than the height of a readily legible text character, when seen from the user's perspective when the lens is substantially at an operative distance from the user's eye. In some such embodiments, the near-eye display mechanism is configured to display information in a laterally or horizontally elongate display area in which a single line of text is displayable.

In some embodiments, a cooperating projector assembly is configured to extend laterally along a top rail or bar of the eyewear frame, the projector assembly being in register with the display mirror and being located substantially above it. The projector assembly is thus in an overhead configuration relative to the display mirror. In such embodiments, the projector assembly may be located entirely within a top bar of a corresponding lens holder provided by the eyewear frame. It will thus be seen that in some embodiments, the display mechanism is physically incorporated entirely within the structure of the article of eyewear, so that no part of the projector assembly or the display reflector projects from the exterior of either the eyewear frame or the lens(es).

Figure 2:
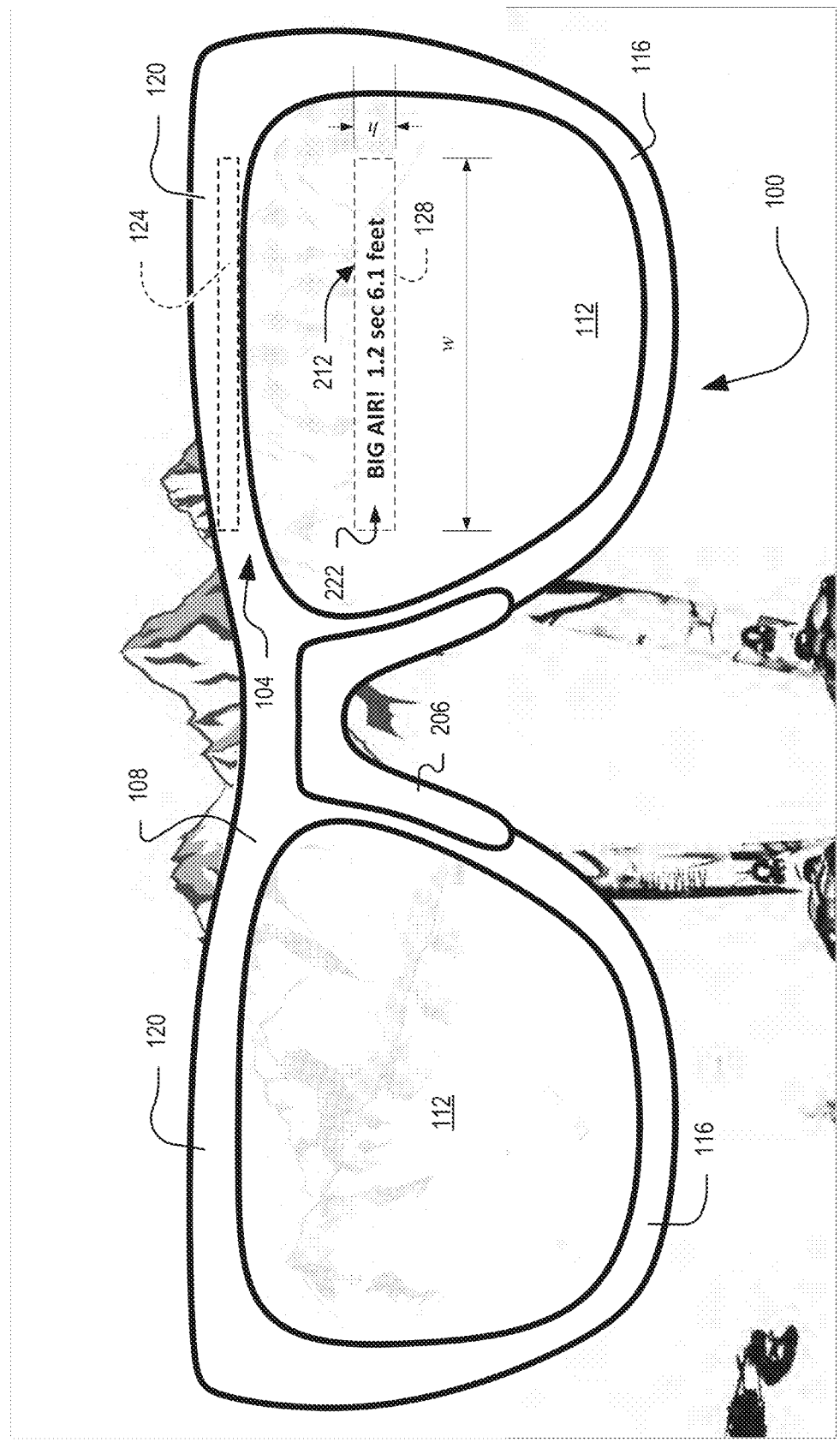
FIG. 2 is a schematic view from a user's perspective of an eyewear device that includes a display mechanism according to an example embodiment.

In FIGS. 1 and 2, reference numeral 100 generally indicates one example embodiment of an eyewear device. The eyewear device is in the example form of a pair of glasses 100 having a compact integrated near-eye display mechanism 104 for providing a heads-up display.

The glasses 100 includes a frame 108 and a pair of transmissive optical elements in the form of respective lenses 112 supported by the frame 108. The lenses 112 are in this example non-corrective lenses, therefore allowing light to pass therethrough substantially without distortion. The glasses 100 are in this example embodiment configured for outdoor use as sunglasses, so that the lenses 112 are sunglass lenses that filter ambient light passing therethrough on to the eyes of a user. Note that different types of lenses or other transmissive optical elements can, in other embodiments, be used to provide a base for the integrated near-eye display mechanism 104. For example, the display mechanism 104 can in other embodiments be provided in cooperation with optically corrective lenses, with swimming goggles, with a head-mounted visor, or the like.

Note also that, for clarity and brevity of description, the orientation of and spatial relationships between various elements of the glasses 100 are described as being, for example, horizontal or lateral, vertical, above or below another element, and the like. These spatial relationships and orientations are described with respect to orientation of the glasses in an idealized operative condition in which the glasses 100 are borne by a user whose head is upright and level. It will be appreciated, however, that the orientation of the glasses 100 and its various parts is changeable in absolute terms, and that the above-mentioned terms describing spatial orientation of the various components are non-limiting.

As can best be seen in FIG. 2, which shows the glasses 100 more or less in the operative orientation from a user's perspective, the frame 108 includes a pair of lens holders 116 in the example form of lens rims bordering respective cavities within which the lenses 112 are held captive. In conventional fashion, a bridge piece 206 located between the lens holders 116 is configured for resting on a nose bridge of the user, in use. When the glasses 100 are worn by the user, the lenses 112 are positioned closely in front of the user's eyes, so that the user's field of view is covered substantially completely by the lenses 112. The user thus views her environment almost entirely through the transmissive optical elements provided by the lenses 112.

An operatively upper part of each lens holder 116 is defined by a top bar 120 that extends substantially laterally across the face of a user, typically being more or less horizontal when the glasses 100 are worn. The display mechanism 104 in this example embodiment includes a projector assembly 124 housed by the top bar 120 of one of the lens holders 116, the projector assembly 124 being in an overhead configuration relative to the associated lens 112. As can be seen both in FIGS. 1 and 2, the display mechanism 104 further includes a partially transmissive reflector in the example form of a 50% mirror 128 embedded in the lens 112 below the projector assembly 124.

In this example embodiment, the display mechanism 104 provides for asymmetrical display of information in front of only one of the user's eyes. Note, however, that other embodiments provide for respective display mirrors 128 and projector assemblies 124 in association with both of the lenses 112. These elements can be similar to any of the optical elements or assemblies discussed herein with respect to only the right-hand one of the lenses 112. In other words, although the display mechanism 104 is described as providing a near-eye display for only one eye, it is to be appreciated that other embodiments can provide for the heads-up display of visual information to both eyes of the user.

Referring again to FIG. 1, it can be seen that the example display mirror 128 has a curved reflective surface that is inclined relative to the vertical such as to reflect light rays projected on to it by the projector assembly 124 towards the eye of a user wearing the glasses 100. The reflective surface of the mirror 128 is curved to focus light emanating from the projector assembly 124 at a point corresponding more or less to the user's pupil. In this way, a virtual image representing visual information generated by the projector assembly 124 is presented to the user, providing a near-eye display for displaying visual information to the user. The virtual image of the near-eye display appears to the user to be located in a display area 212 (see FIG. 2) corresponding to location of the mirror 128 in the lens 112, when seen in projection from the perspective of the user (i.e., corresponding to the view of FIG. 2).

In the current example embodiment, the display area 212 is elongate, having an aspect ratio of about 12:1, and extends laterally across the user's field of view. A width dimension (w) of the display area 212 is thus oriented more or less horizontally when the glasses 100 are level, as is the case in the example view of FIG. 2.

The display area 212 is in this example located centrally in the lateral extent of the associated lens 112, corresponding to about three quarters of the width of the lens 112. The display area 212 is therefore in this example embodiment located more or less centrally within the field of view of the user, both horizontally and vertically. In other example embodiments, the mirror 128 may be oriented and/or configured such that the display area 212 is horizontally and/or vertically offset from a central portion of the user's field of view. Instead, or in addition, the display area 212 can in other embodiments extend horizontally/laterally for a smaller portion of the user's visual span. In other embodiments, the display area 212 extends across the entirety of the lateral width of the lens 112.

Turning again to FIG. 1, it can be seen that the projector assembly 124 in this example embodiment comprises a display matrix or display panel 132 sandwiched between an illumination subassembly 136 and an optics subassembly 140. The illumination subassembly 136 provides backlighting for the display panel 132. The optics subassembly 140 comprises lenses and filters configured to condition and direct light emitted by the display panel 132 onto the reflective surface of the display mirror 128. In this example embodiment, the display panel 132 is a liquid crystal display (LCD), but in other embodiments the display panel 132 may be of any other suitable type, for example being a liquid crystal on silicon (LCOS) display, an organic light-emitting diode (OLED) display, or any other such display. The optics subassembly 140 can in some embodiments include lenses, optical coatings, prisms, mirrors, waveguides, holograms, spatial light modulators, and other optical components in various combinations.

In this example embodiment, the display mirror 128 is embedded wholly within the optical material of the lens 112. Referring again to FIG. 1, it will be seen that the lens 112 has a pair of oppositely outwardly facing major outer faces 144 connected by a peripheral edge face 148 extending transversely between the major outer faces 144 at the periphery of the lens 112. Thus, in this example embodiment, the display mirror 128 is located between the major outer faces 144 of the lens 112, and does not protrude from the smooth major outer faces of the lens 112. As a result, the lens assembly comprising the lens 112 and the display mirror 128 is superficially similar in appearance to analogous eyeglass lenses without an integrated display element.

It will be appreciated that, to allow location of the display mirror 128 wholly within the lens 112, a thickness dimension (t) of the display mirror 128 is somewhat smaller than a corresponding thickness dimension of the lens 112. With reference to FIG. 1, it will be understood that the thickness dimension of the lens 112 is defined by the transverse distance between the major faces 144 of the lens 112. In this example embodiment, the thickness of the lens 112 is about 6 mm, the thickness (t) of the display mirror 128 is about 6 mm (although being fractionally smaller that the thickness of the lens), and a related height dimension (h) is about 6 mm. The values for these dimensions for some other example embodiments vary between 2 mm and 10 mm.

The projector assembly 124 is housed in the top bar 120 of the eyewear frame 108 such that photons and light emitted by the projector assembly 124 enter the optical medium provided by the lens 112 at an operatively top portion of the edge face 148. Such beams of light or photons thereafter travel via the optical medium provided by the lens 112 onto the reflective curved surface of the display mirror 128. The display mirror 128 changes the direction of light impinging there on so that it travels more or less horizontally, exiting the lens 112 at an inner one of the major faces 144 (i.e., the major face 144 of the lens 112 closest to the user) towards the user's eye. The various optical components of the optics subassembly 140 can be sized and shaped to magnify the image projected by the display panel 132, so that the image viewed by the user from the convex reflective surface of the display mirror 128 is larger in one or more dimensions than the image emitted from the display panel 132.

Note that the display mirror 128 is at least partially transparent in the direction of its thickness dimension. Light that travels from the environment across the thickness dimension of the lens 112 and that is coincident with the display mirror 128 thus travels at least partially through the display mirror 128 and onto the user's eye. The user is thus afforded a substantially unimpeded view of the environment through the display mirror 128 when no information is displayed thereon. As is illustrated schematically in FIG. 2, the optical characteristics of the lens 112 and the display mirror 128 are in this example embodiment selected such that, to the user, the display mirror 128 is visually substantially indistinct from the lens 112 by which it is carried. Phrased differently, the display mirror 128 is substantially invisible to the user.

The projector assembly 124 is connected to controlling circuitry in the example form of a computer system 152 incorporated in the frame 108 of the glasses 100 (see FIG. 1). In this example embodiment, electronic components of the computer system 152 are housed in one or more lateral end pieces 156 of the eyewear frame 108. The computer system 152 is connected to the display panel 132 of the projector assembly 124 to control display of the computer-generated imagery projected by the projector assembly 124 onto the display mirror 128. In the embodiment of FIG. 2, the computer system 152 is powered by a suitable rechargeable battery (not shown), integrated in the eyewear frame 108. In some embodiments, some components of the computer system 152 (for example, the rechargeable battery) can be incorporated in one or more of the temples 160 of the frame 108.

In this example embodiment, the computer system 152 of the glasses 100 is provided primarily for controlling the display of text communications via the display mechanism 104. The electronics-enabled glasses 100 is thus in this example embodiment configured to serve as a peripheral device for use with a master mobile electronic device, such as a smartphone, carried by the user and wirelessly coupled to the computer system 152 of the glasses 100. The computer system 152 may further include one or more sensors mounted on the eyewear frame 108 and communicatively coupled to the controlling mobile electronic device and/or to one or more processors forming part of the computer system 152.

In other embodiments, the computer system 152 of the glasses 100 is a fully enabled independent onboard computer system to provide multiple computing and communication functions independently from a separate mobile electronic device. The glasses 100 may in some of these embodiments be configured to function as a wearable smartphone. In some embodiments, the glasses 100 may further include one or more integrated onboard cameras mounted on the frame 108. In some such embodiments, the camera(s) may be operatively connected to the display mechanism 104 (e.g., via the computer system 152) to enable heads-up display via the near-eye display mechanism 104 of visual information captured by the camera(s).

In this example embodiment, the display mechanism 104 and computer system 152 of the glasses 100 are configured to provide exclusively for display of text characters in the heads-up display. Moreover, the optical display mechanism 104 and the display mirror 128 are shaped and configured such as to provide for heads-up display, via the display mirror 128, of only a single line of text characters. "Text characters" mean graphical characters forming part of a predefined set of characters, graphic symbols, or graphic devices available for display. Such a set of available symbols may be provided, in isolation or in combination, by one or more extended character sets including, for example, Unicode characters, ASCII characters, emoticon sets, and the like. In other embodiments, the display panel 132 and controlling electronics may be configured to provide also for non-text display, e.g., to display computer-generated graphical information such as, say, exercise graphs, health information graphs, statistical information, animated images, and the like.

Yet further, the projector assembly 124 is in this example embodiment configured for providing a monochrome display, so that the line of text displayed to apparently be superimposed on the lens 112 is invariably in a single, consistent color. In other embodiments, the projector assembly 124 may be configured for providing multi-color display, the display panel 132 for example being an RGB LCD.

A benefit of providing for a monochrome display limited to the display of text characters as in the described example embodiment is that it allows for increased compactness of electronic components of the display mechanism 124 and or the onboard computer system 152. This facilitates structural integration of these components into the frame 108 without significant adverse effects to the size, weight, and/or appearance of the glasses 100. Note, however, that some embodiments provide for such comprehensive structural integration of the display- and computer components while providing for greater display options and/or for multicolor display.

As will be evident from the description herein, the optical head-mounted display provided by the integrated display mechanism 104 provides for display of information overlaid on a view of the ambient environment visible to the user through the lenses 112. This is because the display mirror 128 is partially reflective, allowing passage of sufficient light through the display mirror 128 in a direction transverse to the lens 112 to allow substantially unimpeded view of the surroundings. Thus, when no information is displayed to the user by the display mechanism 104, the glasses 100 are usable in conventional fashion, with little or substantially no obstruction of the user's view.

When, however, information is to be displayed to the user by the display mechanism 104, the relevant text characters are projected by the projector assembly 124 onto the display mirror 128 and are visible to the user via the display mirror 128. In the example embodiment of FIG. 2, for example, contemporary information about a user's ongoing outdoor activities are displayed on the near-eye display in the form of a one-line text message 222 appearing centrally in the user's field of view. Because the vertical extent of the text message 222 is limited, the user can read the message 222 without having to divert visual attention from the ambient surroundings.

Benefits of the example glasses 100 include that the display mechanism 104 is integrated in an apparently conventional structure of the eyewear frame 108 and lenses 112, with minimal exterior features that prominently distinguish the glasses 100 from similar eyewear having no integrated display. This is achieved partly by limiting the height dimension (h) of the display mirror 128, which in the example embodiment of FIGS. 1 and 2 enables location of the display mirror 128 wholly within the corresponding lens 112. It will be appreciated that, in the configuration of the described example embodiments, the thickness dimension (t) of the display mirror 128 is proportional to the vertical dimension (h) of the display area 212 to be provided by the mirror 128. Limitation of the height dimension of the display area 212, to provide an elongate laterally extending display area 212 (e.g., limited to single line of text) allows for the display mirror 128 to have a thickness dimension (t) sufficiently small for location within a lens 112 that is not excessively thick.

Some benefits stemming from the provision of a display image reflector or redirector such as the exemplified display mirror 128 can also be realized in embodiments where the reflector is located at least partially outside of the optical medium of the lens 112. In one example embodiment, a reflector similar or analogous to the described display mirror 128 may be located on the inner or outer major face of the lens 112, but having a thickness dimension substantially smaller than would have been the case if a display area with conventional aspect ratio (e.g., 16:9, 4:3, or the like) were to be provided. This allows for a less prominent integrated display for electronics-enabled glasses, and therefore allows for display-enabled glasses that are less bulky and aesthetically more pleasing than is the case with existing models.

Figure 3:
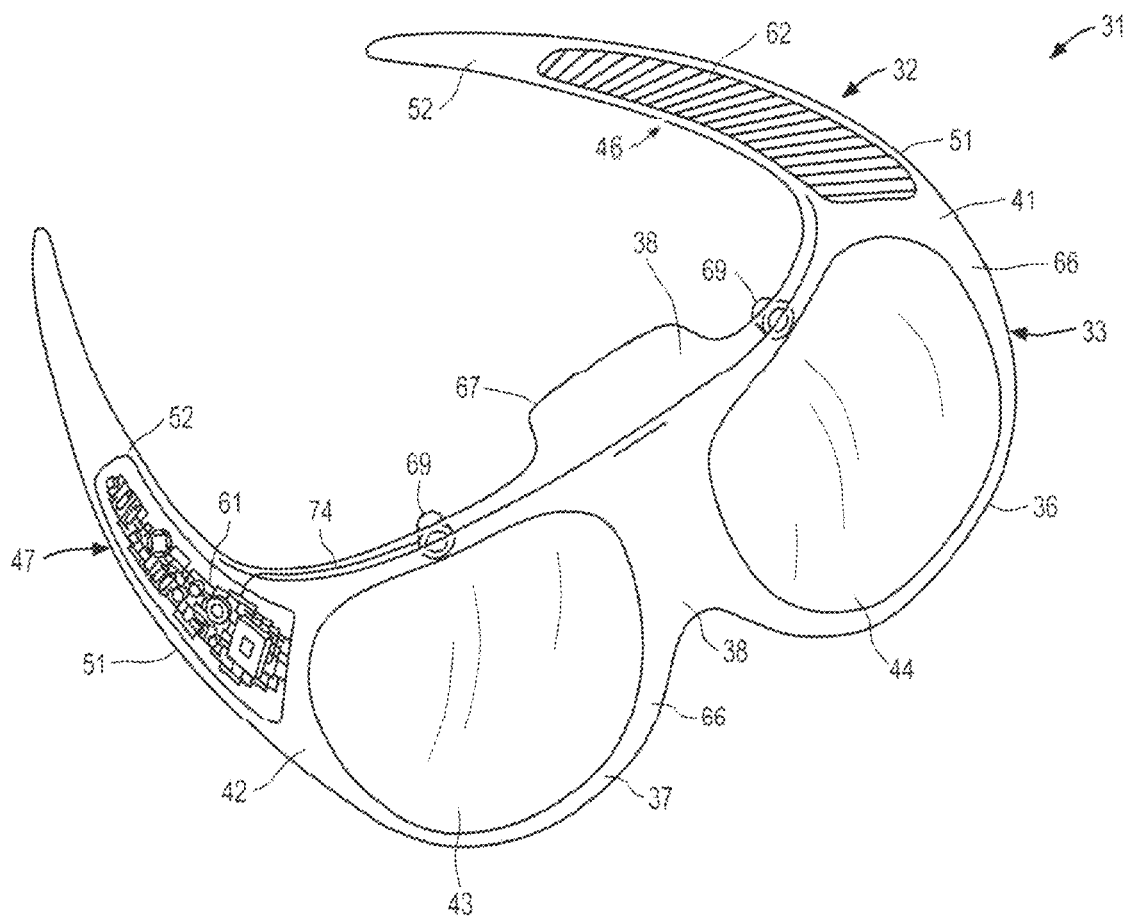
FIG. 3 is a schematic three-dimensional view of an electronics-enabled article of eyewear according to another example embodiment.

FIG. 3 shows a front perspective view of glasses 31 in which an integrated near eye display mechanism similar or analogous to that described with reference to FIGS. 1 and 2 can be provided in accordance with certain embodiments. The glasses 31 can include a frame 32 made from any suitable material such as plastic or metal, including any suitable shape memory alloy. The frame 32 can have a front piece 33 that can include a first or left lens, display or optical element holder 36 and a second or right lens, display or optical element holder 37 connected by a bridge 38. The front piece 33 additionally includes a left end portion 41 and a right end portion 42. A first or left optical element 43 and a second or right optical element 44 can be provided within respective left and right optical element holders 36, 37. Each of the optical elements 43, 44 can be a lens, a display, a display assembly or a combination of the foregoing. Any of the display assemblies disclosed herein can be provided in the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece so as to be integral with the front piece 33. Each of the temple pieces 46 and 47 can include a first portion 51 that is coupled to the respective end portion 41 or 42 of the front piece 33 and any suitable second portion 52, such as curved or arcuate piece, for coupling to the ear of the user. In one embodiment the front piece 33 can be formed from a single piece of material, so as to have a unitary or integral construction. In one embodiment, such as illustrated in FIG. 1, the entire frame 32 can be formed from a single piece of material so as to have a unitary or integral construction.

Glasses 31 can include a computing device, such as computer 61, which can be of any suitable type so as to be carried by the frame 32 and, in one embodiment of a suitable size and shape, so as to be at least partially disposed in one of the temple pieces 46 and 47. In one embodiment, as illustrated in FIG. 3, the computer 61 is sized and shaped similar to the size and shape of one of the temple pieces 46, 47 and is thus disposed almost entirely if not entirely within the structure and confines of such temple pieces 46 and 47. In one embodiment, the computer 61 can be disposed in both of the temple pieces 46, 47. The computer 61 can include one or more processors with memory, wireless communication circuitry, and a power source. As described above, the computer 61 comprises low-power circuitry, high-speed circuitry, and a display processor. Various other embodiments may include these elements in different configurations or integrated together in different ways. Additional details of aspects of computer 61 may be implemented as described with reference to display mechanism 104 above.

The computer 61 additionally includes a battery 62 or other suitable portable power supply. In one embodiment, the battery 62 is disposed in one of the temple pieces 46 or 47. In the glasses 31 shown in FIG. 3 the battery 62 is shown as being disposed in left temple piece 46 and electrically coupled using connection 74 to the remainder of the computer 61 disposed in the right temple piece 47. The one or more input and output devices can include a connector or port (not shown) suitable for charging a battery 62 accessible from the outside of frame 32, a wireless receiver, transmitter or transceiver (not shown) or a combination of such devices.

Glasses 31 include cameras 69. Although two cameras are depicted, other embodiments contemplate the use of a single or additional (i.e., more than two) cameras. Some embodiments provide for glasses 31 without any cameras. In various embodiments, glasses 31 may include any number of input sensors or peripheral devices in addition to cameras 69. Front piece 33 is provided with an outward facing, forward-facing or front or outer surface 66 that faces forward or away from the user when the glasses 31 are mounted on the face of the user, and an opposite inward-facing, rearward-facing or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as cameras 69 that can be mounted on or provided with the outer surface 66 of the front piece 33 or elsewhere on the frame 32 so as to be facing away from the user. Such sensors, peripheral devices or peripherals can additionally include biometric sensors, location sensors, or any other such sensors.

EXAMPLE MACHINE AND HARDWARE COMPONENTS

The example eyewear device described above may incorporate various computer components or machine elements, at least some of which are configured for performing automated operations and/or for automatically providing various functionalities. These include, for example, display functionalities provided by the display mechanism 104 of glasses 100. As discussed previously, the glasses 100, 31 may provide an independent computer system. Instead, or in addition, the glasses 100, 31 may form part of a distributed system including on ore more off-board processors and/or devices. It is to be understood that the description of example hardware and software architecture and components applies to some embodiments of electronics-enabled eyewear devices in isolation, to off-board components cooperating with such eyewear devices, or to such an eyewear device and supporting off-board components in combination, as the case may be.

Figure 4:
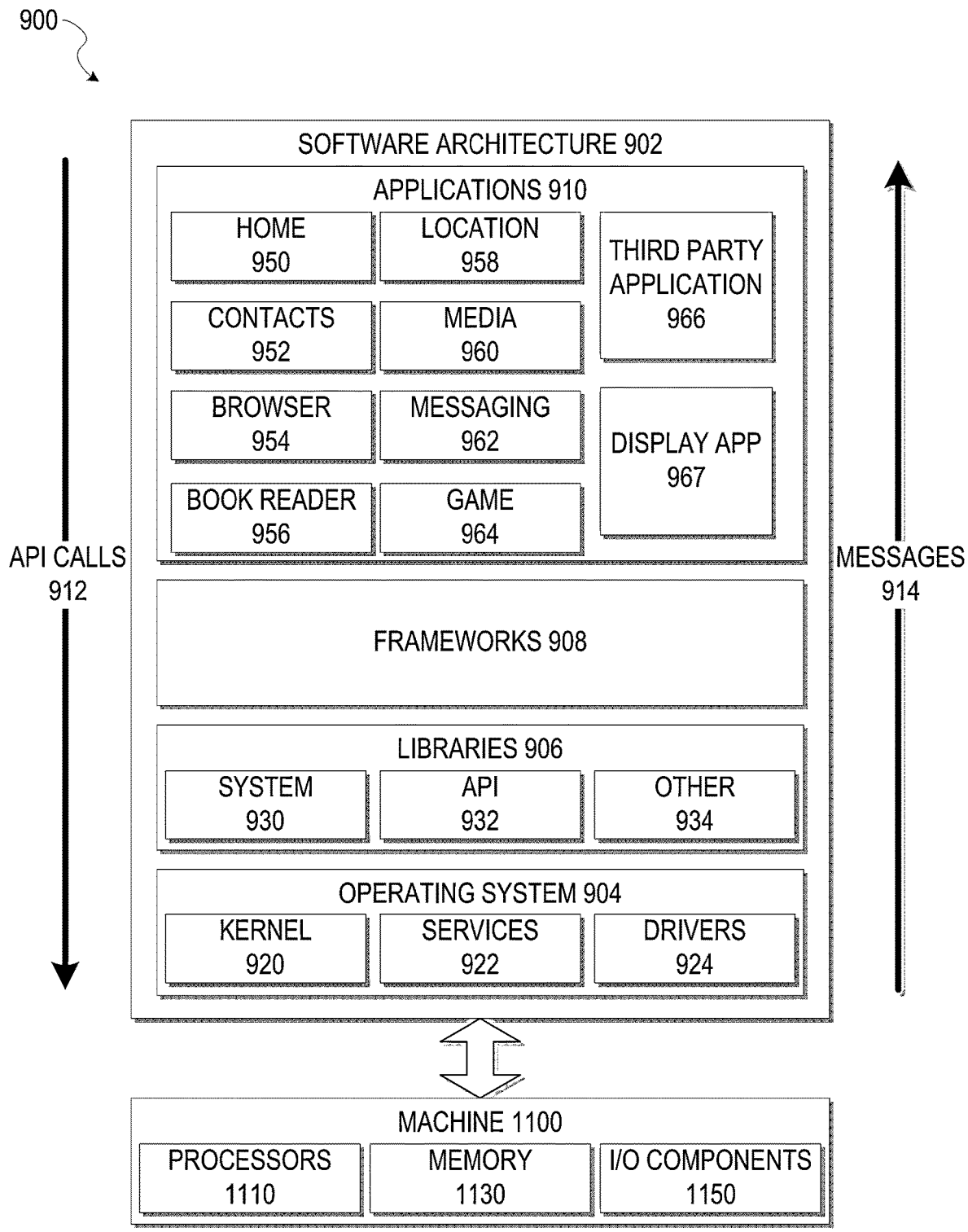
FIG. 4 is a block diagram illustrating an example of a software architecture that may be installed on a machine, according to some example embodiments.

FIG. 4 is a block diagram 900 illustrating an architecture of software 902, which can be installed on any one or more of the devices described above. FIG. 4 is merely a non-limiting example of a software architecture, and it will be appreciated that many other architectures can be implemented to facilitate the functionality described herein. In various embodiments, the software 902 is implemented by hardware such as machine 1100 of FIG. 5 that includes processors 1110, memory 1130, and I/O components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device, server computer of a server system, or any other device described herein may operate using elements of software 902. Devices such as the computer system 152 and display mechanism 104, as described earlier, may additionally be implemented using aspects of software 902.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the display mechanism 104 of smart glasses 100, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Embodiments described herein may particularly interact with a display application 967. Such an application 967 may interact with I/O components 1150 to establish various wireless connections with devices such as the display mechanism 104 of glasses 100. Display application 967 may communicate with the display mechanism 104 to automatically control display of computer-generated information via display mechanism 104.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 5:
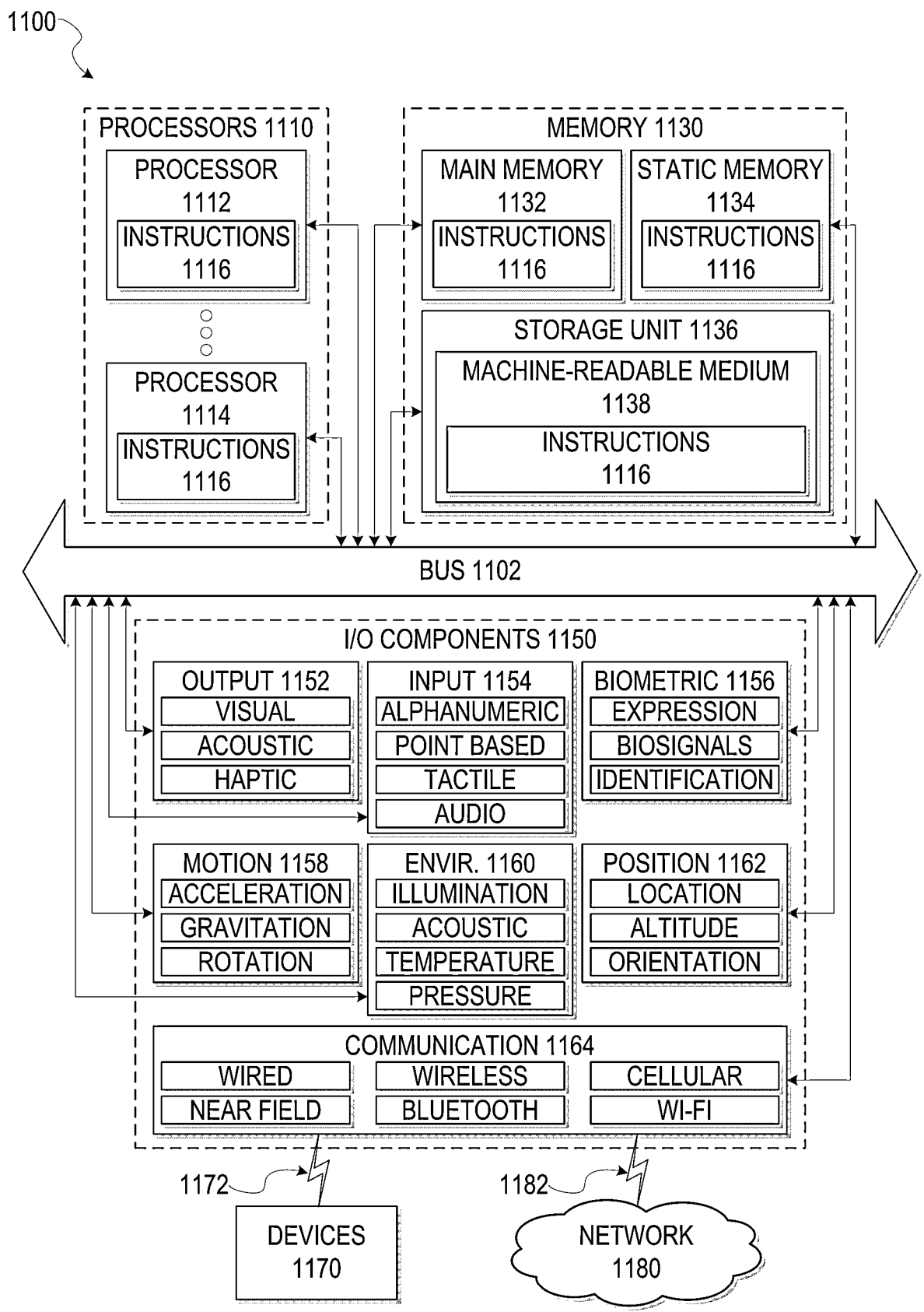
FIG. 5 illustrates a diagrammatic representation of a machine in the form of a computer system within which a set of instructions may be executed for causing the machine to perform any one or more of the methodologies discussed herein, according to an example embodiment.

FIG. 5 is a block diagram illustrating components of a machine 1100, according to some embodiments, able to read instructions from a machine-readable medium (e.g., a machine-readable storage medium) and perform any one or more of the methodologies discussed herein. Specifically, FIG. 5 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 5 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 5. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

What is claimed is:

1. An eyewear device comprising:
    an eyewear frame configured for head-mounted wear;
    a lens mounted on the eyewear frame to occupy a field of view a wearer of the eyewear device, the lens providing an optical medium for display light traveling within the lens, and the lens being transmissive to ambient light; and
    an integrated near-eye display mechanism configured to display visual information to the wearer, the display mechanism comprising:
        a display structure that is located within the lens and that is configured to direct into view of the wearer display light incident thereon while traveling within the optical medium provided by the lens, the display structure being transmissive to ambient light traveling through the lens, the lens thus being display-enabled; and
        a projector that is housed by the eyewear frame and that is configured to project display light for computer-generated imagery directly into the optical medium, such that a path travelled by the display light comprises, sequentially:
            from the projector into the optical medium of the lens at projector-lens interface located within the eyewear frame, the display light traveling between the projector and the projector-lens interface without exiting an interior volume of the eyewear frame and without entering any intervening optical medium external to the eyewear frame;
            from the projector-lens interface, via the optical medium provided by the lens on to the display structure, from the display light thereupon being redirected by the display structure the wearer; and
            from the display structure towards the wearer, the display light exiting the optical medium to enable viewing of the computer-generated imagery by the wearer.

2. The eyewear device of claim 1, wherein projector and the projector-lens interface are arranged such that the display light travels from the projector directly onto the projector-lens interface without entering any intervening optical medium, the display light traveling from the projector-lens interface on to the display structure exclusively via the optical medium provided by the lens.

3. The eyewear device of claim 1, wherein the lens forms part of a pair of lenses held by the eyewear frame for respective eyes of the wearer, and wherein both of the pair of lenses are display-enabled, each lens having embedded therein a respective display structure.

4. The eyewear device of claim 1, wherein a volume of the lens that provides the optical medium is bounded by a pair of substantially parallel major faces that are oriented transversely to a viewing direction through the lens, direction of travel of the display light within the optical medium between the projector-lens interface being substantially parallel to the pair of major faces, the display light after redirection by the display structure traveling transversely to the pair of major faces.

5. The eyewear device of claim 4, wherein the display structure is embedded wholly within the optical medium of the display-enabled lens, no part of the display structure projecting from either or the pair of major faces of the lens.

6. The eyewear device of claim 4, wherein the projector is integrated in the eyewear frame, being obscured by the eyewear frame from external view, and wherein the projector-lens interface is likewise obscured by the eyewear frame from external view.

7. The eyewear device of claim 6, wherein the projector is housed by the eyewear frame such as to be located, from the wearer's perspective during wear, substantially above the display structure.

8. The eyewear device of claim 7, wherein the eyewear frame comprises a top bar extending substantially laterally along an operatively upper portion of a peripheral edge face of the lens, the projector being housed within the top bar of the eyewear frame.

9. The eyewear device of claim 8, wherein:
the projector is located entirely within the top bar of the eyewear frame; and
wherein the display structure is located entirely between the pair of major faces of the lens, so that the display mechanism is physically incorporated entirely within a structure of the eyewear device, no part of the projector or the display structure projecting from the exterior of either the eyewear frame or the pairs of lenses.

10. The eyewear device of claim 4, wherein:
the volume of the lens is further bounded by a peripheral edge face that extends transversely between the major faces and that extends peripherally around the lens, and
wherein the projector-lens interface is defined by a portion of the peripheral edges face received within the top bar, projector being arranged to project display light into the optical medium provided by the lens via said portion of the peripheral edge face.

11. The eyewear device of claim 10, wherein the projector is located immediately above an upper portion of the peripheral edge face of the lens, such that display light emitted by the projector directly enters the optical medium via the peripheral edge face, without entering any intervening optical medium.

12. The eyewear device of claim 1, wherein display structure defines a display area that is elongate, having a lengthwise dimension that extends substantially laterally across at least a part of a field of view of the wearer.

13. The eyewear device of claim 12, wherein the display area substantially spans the wearer's field of view widthwise.

14. The eyewear device of claim 12, wherein the display area is located substantially centrally within the field of view of the wearer.

15. A near-eye display system comprising:
a lens configured for use in a near-eye position in which the lens occupies a field of view a user, so that a user-perspective view of an ambient environment is afforded through the lens, the lens providing an optical medium for display light traveling within the lens, and the lens being transmissive to ambient light;
a display structure that is located within the lens and that is configured to direct into view of the user display light incident thereon while traveling within the optical medium provided by the lens, the display structure being transmissive to ambient light traveling through the lens, the lens thus being display-enabled; and
a projector that is configured to project display light for computer-generated imagery directly into the optical medium without entering any intervening optical medium between the projector and the lens, such that the display light travels from the projector on to the display structure exclusively via the optical medium provided by the lens, from where the display light is directed by the display structure towards the user.

16. The display system of claim 15, wherein a volume of the lens that provides the optical medium is bounded by a pair of substantially parallel major faces that are oriented transversely to a viewing direction through the lens, direction of travel of the display light within the optical medium onto the display structure being substantially parallel to the pair of major faces.

17. The display system of claim 16, wherein the display structure is embedded wholly within the optical medium of the lens, no part of the display structure projecting from either or the pair of major faces of the lens.

\* \* \* \* \*